United States Patent
Davenport et al.

(10) Patent No.: US 6,831,551 B2
(45) Date of Patent: Dec. 14, 2004

(54) METHOD AND SYSTEM FOR MODULATING A CARRIER FREQUENCY TO SUPPORT NONDESTRUCTIVE BITWISE ARBITRATION OF A COMMUNICATION MEDIUM

(75) Inventors: David Davenport, Niskayuna, NY (US); Ralph Hoctor, Saratoga Springs, NY (US); Kuna Kishore, Bangalore (IN); Mukesh Soni, Raipur Chhattisgarh (IN)

(73) Assignee: General Electric Company, Niskayuna, NY (US)

( * ) Notice: Subject to any disclaimer, the term of this patent is extended or adjusted under 35 U.S.C. 154(b) by 172 days.

(21) Appl. No.: 10/248,117

(22) Filed: Dec. 19, 2002

(65) Prior Publication Data
US 2004/0120356 A1 Jun. 24, 2004

(51) Int. Cl.$^7$ ............................................. H04M 11/04
(52) U.S. Cl. ........................... 340/310.06; 340/310.01; 340/310.02
(58) Field of Search ....................... 340/310.01, 310.02, 340/310.06, 310.07, 310.08, 870.02; 327/330, 332; 709/209, 236

(56) References Cited

U.S. PATENT DOCUMENTS

| | | | | |
|---|---|---|---|---|
| 4,644,547 A | * | 2/1987 | Vercellotti et al. | 709/236 |
| 4,746,897 A | * | 5/1988 | Shuey | 340/310.06 |
| 4,912,723 A | * | 3/1990 | Verbanets, Jr. | 375/220 |
| 4,974,199 A | * | 11/1990 | Verbanets et al. | 710/17 |
| 5,349,644 A | * | 9/1994 | Massey et al. | 706/10 |
| 6,538,577 B1 | * | 3/2003 | Ehrke et al. | 340/870.02 |

* cited by examiner

Primary Examiner—Van T. Trieu
(74) Attorney, Agent, or Firm—Paul J. DiConza; Patrick K. Patnode

(57) ABSTRACT

A system for modulating a carrier frequency to support nondestructive bitwise arbitration of a communication medium. The system comprises a first sensor module coupled to a power supply line via a first power line coupling circuit. The first sensor module comprises a first micro-controller and a first transceiver. The first transceiver includes a first transmitter for converting a digital signal received from the first micro-controller into a first analog signal for transmission over the power supply line. The first transmitter includes a first oscillator operating within an allowable frequency deviation to provide a first predetermined onset phase. The system further comprises a second sensor module coupled to the power supply line via a second power line coupling circuit. The second sensor module comprises a second micro-controller and a second transceiver. The second transceiver includes a second transmitter for converting a digital signal received from the second micro-controller into a second analog signal for transmission over the power supply line. The second transmitter includes a second oscillator operating within the allowable frequency deviation to provide a second predetermined onset phase. The second analog signal is different from the first analog signal and the second predetermined onset phase is different from the first predetermined onset phase. The difference between the first predetermined onset phase and the second predetermined onset phase is within a limit.

24 Claims, 10 Drawing Sheets

METHOD AND SYSTEM FOR MODULATING A CARRIER FREQUENCY TO SUPPORT NONDESTRUCTIVE BITWISE ARBITRATION OF A COMMUNICATION MEDIUM

BACKGROUND OF INVENTION

The present disclosure relates generally to a method for communicating data, and in particular, to a method of modulating a carrier frequency to enable nondestructive bitwise arbitration of a communication medium.

The federal government mandates periodic inspection of active warning devices deployed at railroad-highway crossings. Deployment of sensors at a railroad crossing affords the ability to continuously and remotely monitor such warning devices. Flashing lights are one such active warning device typically installed to warn motorists at a crossing. Flashing lights are installed in pairs and normally at least two such pairs are present. At a typical railroad crossing, the flashing light activation and control equipment is located in a bungalow or small cabinet near the railroad crossing. An attractive way to utilize sensors for such a centrally controlled warning system is to exploit the advantages of microprocessors that utilize the Controller Area Network (CAN) protocol.

The CAN bus implements a broadcast serial communications protocol that is built into many currently available micro-controllers. CAN hardware supplies to the user a transparent and fully debugged data-link layer, including packetization of data, error-detection coding and transmission of acknowledgement bits. In addition, parts of the physical layer, notably bit synchronization and multiple access arbitration, are also implemented in CAN. However, the specifics of the communication medium are not given in the CAN specification; this was left open to allow flexibility to system designers.

The CAN protocol is based on carrier-sense multiple access with collision detection (CSMA/CD) using non-destructive bitwise priority arbitration. That means that, prior to transmitting data, each CAN node monitors the transmission medium to see if it is in use; if it is not in use for a fixed period of time, the node starts to transmit. If two nodes transmit at the same time, the node transmitting the higher priority message will end up transmitting its whole message, while the other node will terminate its transmission once it finds that it is sending the lower priority message. This is what is meant by "non-destructive priority arbitration." In order to support this feature, the medium must support the transmission of binary symbols having a "dominant" logic state and a "recessive" logic state. These logic states are defined by the way in which they interact when different transmitters are using the medium at the same time. When one node is sending a dominant bit and second is sending a recessive bit, all the nodes in the system, including the node sending the recessive bit, sense the medium as being in the dominant state. This holds true no matter how many nodes assert the recessive state. The CAN standard adopted as ISO11898 utilizes a differential 5 Volt bus on twisted pair wires as the communication medium. A voltage differential in excess of 1.0 Volt represents a dominant bus state equivalent to a logic zero while a voltage differential less than 0.5 Volts represents a recessive bus state equivalent to logic one.

In addition, any number of nodes must be able to assert the dominant state simultaneously without interfering with each other. When a node asserts the recessive state and senses that the bus is in the dominant state, that node knows that it has lost the priority arbitration for the channel, and it stops transmitting at once. Cancellation can occur between out-of-phase carriers when implementing the CAN protocol with a modulated signaling scheme as the physical layer, when two or more non-synchronous transmitters attempt to assert the dominant bus state simultaneously, as happens routinely during bus priority arbitration or when a bus error is detected.

SUMMARY OF INVENTION

One aspect of the invention is a system for modulating a carrier frequency to support nondestructive bitwise arbitration of a communication medium. The system comprises a first sensor module coupled to a power supply line via a first power line coupling circuit. The first sensor module comprises a first micro-controller and a first transceiver. The first transceiver includes a first transmitter for converting a digital signal received from the first micro-controller into a first analog signal for transmission over the power supply line. The first transmitter includes a first oscillator operating within an allowable frequency deviation to provide a first predetermined onset phase. The system further comprises a second sensor module coupled to the power supply line via a second power line coupling circuit. The second sensor module comprises a second micro-controller and a second transceiver. The second transceiver includes a second transmitter for converting a digital signal received from the second micro-controller into a second analog signal for transmission over the power supply line. The second transmitter includes a second oscillator operating within the allowable frequency deviation to provide a second predetermined onset phase. The second analog signal is different from the first analog signal and the second predetermined onset phase is different from the first predetermined onset phase. The difference between the first predetermined onset phase and the second predetermined onset phase is within a limit.

Another aspect of the invention is a system for modulating a carrier frequency to support nondestructive bitwise arbitration of a communication medium. The system comprises a sensor module locally coupled to a warning system for sensing operational performance of the warning system. The sensor module is also locally coupled to a power supply line. The sensor module comprises a sensor element for transducing physical phenomena into electrical signals. The sensor module further comprises a micro-controller that exchanges data according to the controller area network (CAN) standard coupled to the sensor element. The sensor module further comprises a transceiver coupled to the micro-controller, where the transceiver is responsive to CAN bus states issued by the micro-controller for communicating data between the power supply line and the micro-controller. The transceiver includes a transmitter for converting a digital signal from the micro-controller into an analog signal for transmission on the power supply line. The transmitter includes an oscillator operating within an allowable frequency deviation to provide a predetermined onset phase and the transmitter utilizes on/off shift keying for modulation. The transceiver also includes a receiver for converting the analog signal from the power supply line into a digital signal for input to the micro-controller. The receiver includes an in-band energy detector. The system further comprises a sensor hub coupled to the power supply line for receiving data from the sensor module via the power supply line.

A further aspect of the invention is a method for modulating a carrier frequency to support nondestructive bitwise arbitration of a communication medium. The method comprises receiving a request to initiate data transfer including a first CAN formatted message frame with a first identifier. The request is received from a first micro-controller located at one of a plurality of nodes coupled to a power supply line. The method further comprises detecting an idle CAN bus on the power supply line and sending the first CAN formatted message frame across the power supply line using a first transceiver operating under the CAN protocol. The first transceiver includes a first transmitter that includes a first oscillator operating within an allowable frequency deviation and sending the first CAN formatted message frame includes turning on the first oscillator in a first predetermined onset phase in response to detecting a dominant bit in the first identifier to implement the CAN protocol over the power supply line. The method further comprises sending a second CAN formatted message frame including a second identifier across the power supply line using a second transceiver operating under the CAN protocol. The second transceiver includes a second transmitter that includes a second oscillator operating within the allowable frequency deviation. Sending the second message frame includes turning on the second oscillator in a second predetermined onset phase in response to detecting a dominant bit in the second identifier to implement the CAN protocol over the communication medium. The second predetermined onset phase is different from the first predetermined onset phase and the difference between the first predetermined onset phase and the second predetermined phase is within a limit.

Further aspects of the invention are disclosed herein. The above discussed and other features and advantages of the invention will be appreciated and understood by those skilled in the art from the following detailed description and drawings.

BRIEF DESCRIPTION OF DRAWINGS

Referring to the exemplary drawings wherein like elements are numbered alike in the several FIGURES.

DETAILED DESCRIPTION

An embodiment of the present invention is a modulated carrier communication physical layer that leverages a transmitter with a deterministic and repeatable initial, turn-on phase. The transmitter is controlled by an input binary data stream and pulses of the carrier signal are asserted on the medium. Utilizing a transmitter with a deterministic initial phase allows for multiple users to contend and share the communication medium while avoiding destructive signal interference. Such a communication physical layer can be utilized for data exchange over power lines and enable higher link layer protocols such as Controller Area Network (CAN).

An embodiment of the present invention provides the ability to utilize the CAN standard to exchange sensor data between micro-controllers on a CAN bus established over an existing power cable that may be simultaneously providing power to another apparatus. For example, the apparatus may be a railroad warning light and the sensor 104 may be connected to the warning light. The light is made to flash by turning the 10 Volt DC or 10 Volt, 60 Hz AC supply voltage off and on, and during those periods when the power supply is on, the standard CAN physical layer, as described in the background section, cannot be utilized. Instead of utilizing the standard CAN physical layer, an embodiment of the present invention utilizes a modulated signal with a center frequency high enough that the signaling waveform can be separated from the power supply waveform by a linear filter. The CAN requirement for dominant and recessive logic states is addressed through the use of on/off shift keying (OOSK) as the modulation.

Figure 1:
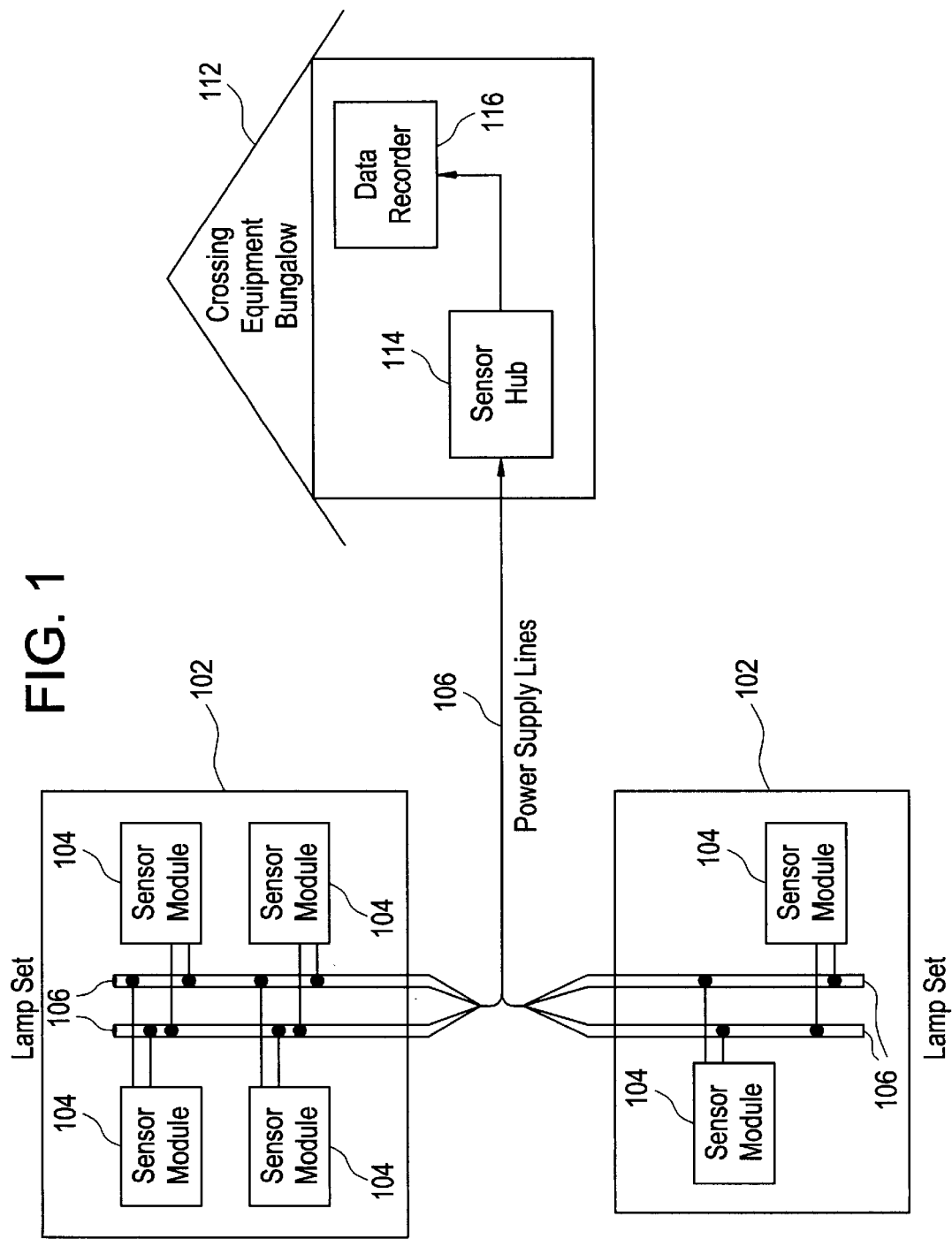
FIG. 1 is a block diagram of an exemplary embodiment of the present invention being utilized to support a railroad crossing flashing light sensor system.

FIG. 1 is a block diagram of an exemplary embodiment of the present invention being utilized to support a railroad crossing flashing light sensor system. As shown in FIG. 1, a railroad crossing may include one or more lamp sets 102. Each lamp set 102 includes one or more sensor modules 104 connected to the power supply lines 106. The sensor modules 104 may be locally coupled to a railroad warning system, such as a railroad crossing light system. By locally coupling sensor modules 104 to a warning system, such as a crossing light system, the monitoring, analysis and control of the flashing light can be handled locally, with multiple systems being integrated via existing power supply lines 106. The power supply lines 106 connect the lamp sets 102 to a sensor hub 114 located in a crossing equipment bungalow 112 close to the railroad crossing. The sensor hub 114 processes information received from the sensor modules 104 and sends data to a data recorder for recording and managing the data received from the sensor hub 114. Note, functionally, the sensor hub 114 contains equivalent transceiver and micro-controller functionality as the sensor module 104. However, the sensor hub 114 does not necessarily incorporate any sensors directly as inputs to its micro-controller. Furthermore, the sensor hub 114 may have multiple transceivers operating in parallel on multiple power line circuits supporting the warning system. In an exemplary embodiment, the sensor hub 114 performs demodulation of multiple data streams from multiple sensor modules 104 and forwards data to the data recorder 116. The data recorder 116 also hosts functional algorithms and threshold values that may be distributed to multiple sensor modules 104 for subsequent comparative analysis. By utilizing a common data recorder 116 for a plurality of lamp sets 102, independent operational configurations can be easily communicated to any one of the lamp sets 102.

Figure 2:
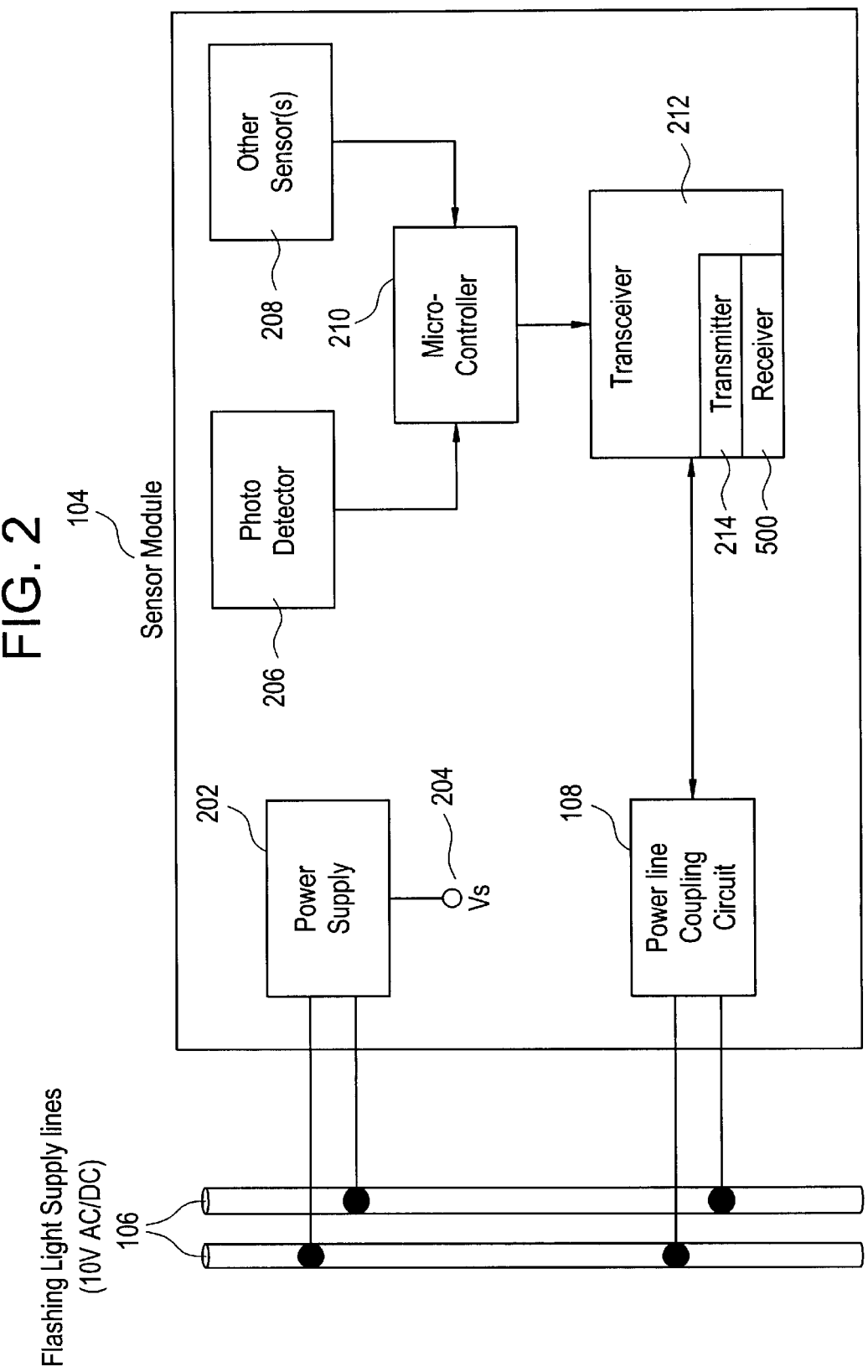
FIG. 2 is a block diagram of a sensor module that includes an exemplary embodiment of the present invention.

FIG. 2 is a block diagram of a sensor module 104 that includes an exemplary embodiment of the present invention.

Use of a modulated signal on a live power line is a standard mode of operation of home power line carrier (PLC) networks, and for a PLC transceiver using a modulated signaling waveform. The line filter interface blocks the AC and/or DC power signal component while passing the modulated carrier frequency (e.g., high pass filtering). Any such filter known in the art can be utilized in an embodiment of the present invention (e.g., see LonWorks product literature from Echelon Corporation and PowerBus product literature from Domosys Corporation). An embodiment of the present invention utilizes a modulation frequency of 100 kHz. The power supply 202 provides power to the sensor module 104 through a voltage input Vs 204. A power supply 202 designed to power the micro-controller 210 through both the on and off periods of the flashing lamp activation is utilized at the sensor module 104 (i.e., the data-gathering CAN node). The power supply 202 will require a large capacitance in order to store the required energy for powering the micro-controller during the off flash period. The power supply must be designed to include sufficient inductance such that the inductive and capacitive reactance at the power line carrier signal frequency are balanced and cancel each other out in order to keep the communications signal from seeing a low impedance to ground at the power supply.

The sensor module also includes a photo detector 206 and other sensors 208 that are electrically connected to a micro-controller 210. The photo detector 206 may be any sensor known in the art that can sense flashing light and provide data to a micro-controller 210. Similarly, the other sensors 208 may be sensors for sensing data points such as light alignment, temperature, noise, gate position, and gate acceleration. Again, they may include any sensors known in the art that can provide data to a micro-controller 210. The micro-controller 210 employs known microprocessor techniques, has multiple analog/digital (A/D) converters (not shown) that can support multiple sensors 206 208, and employs a CAN protocol. The CAN protocol link layer may be embedded in the micro-controller itself or provided via an external, CAN controller integrated circuit. Variants of the Microchip Technology PIC family of micro-controllers that include CAN hardware (eg., PIC18FXX8, PIC18CXX8) can be utilized with an embodiment of the present invention. Alternatively, the Microchip Technology MCP2510 CAN controller can be used with micro-controllers that do not maintain integrated CAN link layer functionality. The PIC family of CAN controllers and micro-controllers allows for data payloads of up to eight bytes that can be sent by loading a set of registers and setting a bit. The sensor module 104 includes a transceiver 212, including a receiver 500 and a transmitter 214, both of which will be described in more detail below. The receiver 500 gets analog input data signals from the power line coupling circuit 108, provides in-band energy detection and outputs digital data signals to the micro-controller 210. Similarly, the transmitter 214 receives digital data signal input from the micro-controller 210, provides an oscillating function and outputs analog data signals to the power line coupling circuit 108. The term digital signal, as used in this document, refers to a signal that has constant voltage over consecutive time intervals having constant duration. The power line coupling circuit provides a high-pass filter interface to the power supply lines 106.

Figure 3:
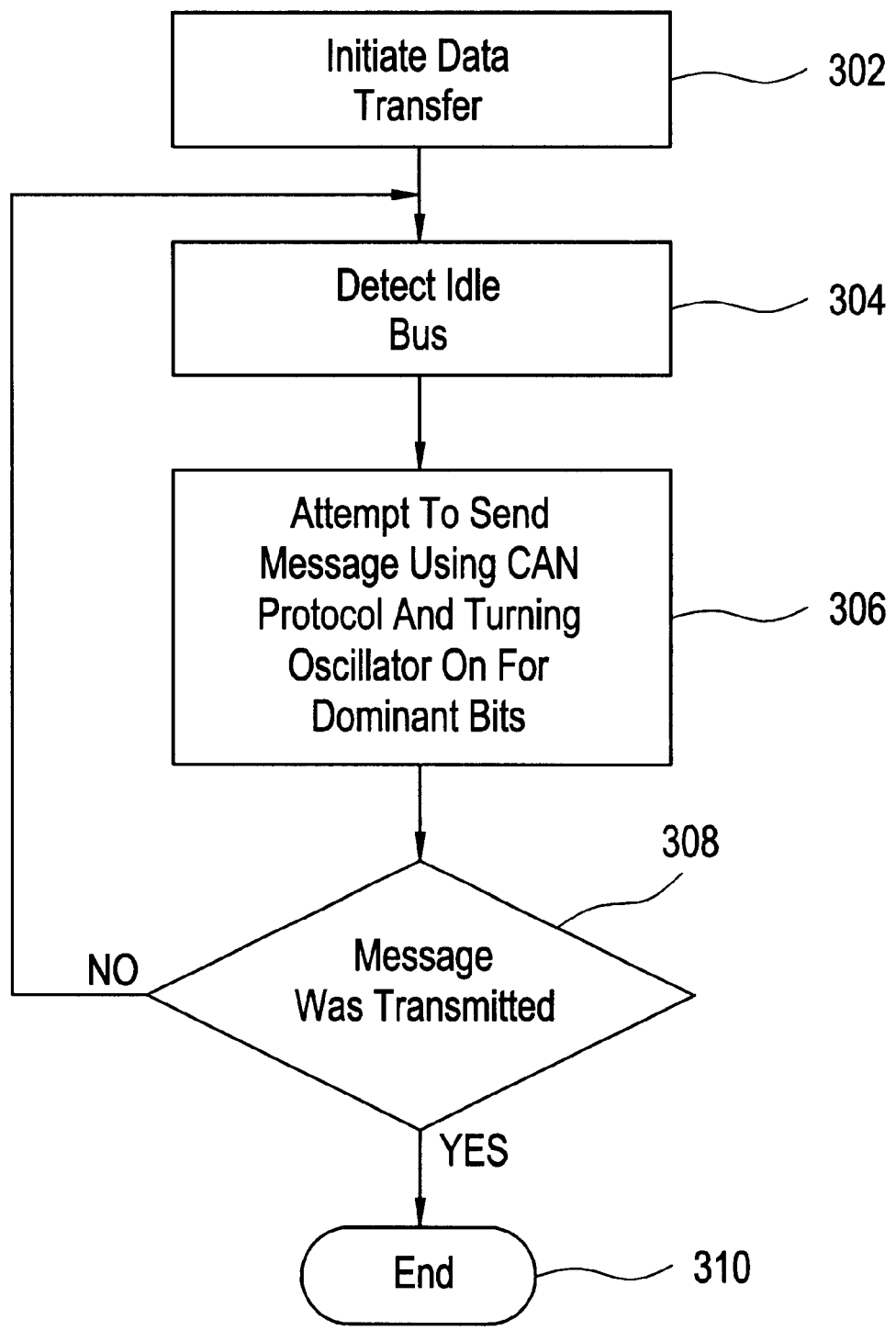
FIG. 3 is a flow chart of a data transfer process that may be performed using an exemplary embodiment of the present invention.

FIG. 3 is a flow chart of a data transfer process that may be performed using an exemplary embodiment of the present invention. At step 302 data transfer to the sensor hub 114 is initiated by a micro-controller 210 located in one of the sensor modules 104. Data transfer can be initiated based on information obtained from the photo detector 206 or from the other sensors 208. Additionally, data transfer can be initiated on a periodic basis or in response to a request for data from a microprocessor located in the crossing equipment bungalow 112. At step 304, as specified in the CAN protocol, the transceiver 212 waits for the bus to be idle for a pre-selected period of time (e.g., equal to eleven bit periods). The transceiver 212 monitors the bus for traffic on the transmission medium (e.g., power supply lines 106). When the bus has been idle for the pre-selected period of time, step 306 is performed to make an attempt at sending the message, using the CAN protocol as described below, across the power supply lines 106 to the sensor hub 114. An embodiment of the present invention includes utilizing an oscillator in conjunction with transmitting dominant bits.

The CAN protocol specifies that any CAN transmitter 214 may start a transmission when it has detected an idle CAN bus. This may result in two or more micro-controllers 210 starting a message (almost) at the same time. The conflict may be resolved in the following manner. The transmitting nodes (e.g., sensor modules 104) monitor the CAN bus, using the receiver 500, while they are sending. If a transmitting node detects a dominant level when it is sending a recessive level, it will immediately quit the arbitration process and become a receiver instead. The arbitration is performed over the whole identifier field and when that field has been sent, exactly one transmitter 214 is left on the bus. This transmitting node continues as if nothing has happened. An important condition for this bit-wise arbitration to succeed is that no two nodes may transmit the-same identifier field. Step 308 in FIG. 3, includes verifying that the message was sent and ending 310 the data transfer if the entire message was sent or alternatively, going back to step 304 to wait for the bus to be idle before attempting to resend the message. This loop, from step 304 through step 308 is continued until the message has been successfully transmitted.

An exemplary embodiment of the present invention includes a transmitter 214 that allows any two CAN nodes (or sensor modules 104) to assert a dominant bit simultaneously without interfering with each other. This places a limit on the degree to which the oscillators of any two transmitters 214 can be out of phase with each other. In an exemplary embodiment of the present invention, the transmitter 214 includes an oscillator controlled by the CAN transmit (output) pin of the micro-controller 210. When the micro-controller 210 wants to assert the dominant bit state, it turns the oscillator on, otherwise it leaves it off. For a single transmitter 214 asserting the dominant bus state, a simple oscillator is a viable implementation. However, when two or more transmitters 214 attempt to assert the dominant bus state simultaneously, as happens routinely during bus priority arbitration or when a bus error is detected, cancellation can occur between out-of-phase carriers. This can be corrected by having all the transmitters 214 in the network completely phase synchronous, but this may not be practical because it would require that each transmitter derive its phase from some common reference, which would have to be made available to all transmitters 214. An exemplary embodiment of the present invention includes an oscillator that starts in a pre-determined phase every time it is turned on, in addition to a set of system operating parameters and oscillator specifications that ensure that the phase difference between any two transmitters 214 in the network remains within some acceptable limit.

For example, the oscillator may be based on an op-amp-based relaxation oscillator. The circuit is made switchable by providing voltage-controlled switches that connect the inverting and non-inverting inputs of the op amp to fixed voltages such that the output is saturated in a known state. A disadvantage of a relaxation oscillator is that it provides a non-sinusoidal output, giving a broader-band carrier. Alternatively, an oscillator that produces a sine wave output, such as a Wien-bridge oscillator could be utilized along with an automatic gain adjustment circuit.

Any oscillator known in the art may be utilized with an embodiment of the present invention as long as it can meet the goal that no two oscillators in the system ever be more than 120 degrees out of phase (i.e., the limit is 120 degrees). This requirement is meant to apply in a pairwise fashion to all transmitters 214 in the network. If two modulated signals of equal amplitude are summed, then the requirement of less than 120 degrees out of phase means that the amplitude of the sum is not less than the amplitude of either of the components. An alternate embodiment of the present invention includes CAN circuitry that is not integrated within the micro-controller 210. The non-integrated CAN circuitry is coupled to the micro-controller 210 and the transceiver 212.

In an exemplary embodiment, the system, or network, refers to sensor modules 104 in lamp sets 102 at a railroad crossing that are coupled to the same power supply lines 106 and sensor hub 114. The oscillator frequency requirement to be applied to the railroad crossing application, depends on the bit synchronization mechanism that is utilized by CAN nodes (or sensor modules 104). Each CAN bit time is subdivided into a user-selectable number of time quanta. The maximum number of time quanta per bit is 25. The time quanta at a given node are generated directly from the micro-controller's 210 clock, and so the time quanta at two different CAN nodes have an arbitrary phase relationship to one another. Synchronization of a CAN node to the rest of the network is done by marking the time of recessive-to-dominant bit transitions in the received waveform. This sets and maintains the bit timing to an accuracy of one time quantum. Therefore, even though the oscillators are phase-synchronized to the CAN transmit pin of the micro-controller 210, oscillators nominally transmitting in the same bit period can start up at times which differ by as much as one time quantum, resulting in an initial phase difference. For example, a bit rate of 10 kbits/sec at a modulation center frequency of 100 kHz results in 10 cycles of the carrier per bit. If the CAN micro-controllers 210 are configured to use the maximum number of time quanta per bit, the uncertainty in the start-up time of the bit translates into a maximum phase difference of 10/25 cycles or 144 degrees. If some difference in center frequency existed between the transmitters 214, significant signal cancellation could take place over the course of one or more bit periods, due to the combination of a large initial phase difference and an accumulated phase difference over time due to the frequency difference.

Another aspect of the CAN specification that may impact the ability to meet the carrier phase requirements is the maximum number of dominant bits that are allowed to be transmitted sequentially. During ordinary operation of the CAN bus, no more than five dominant bits are allowed to occur in a sequence, and the CAN hardware enforces this rule by stuffing recessive bits into long sequences of dominant bits that occur in the message. However, there is one instance in which CAN nodes transmit sequences of more than five dominant bits, and that is when a bus error is flagged. The advantage of this is that the error flag itself is detected as an error by all the nodes on the network, and so all nodes transmit an error flag, which in turn ensures that they are all synchronized with each other. The handling of a bus error by the CAN protocol indicates that the center frequencies of all the transmitters 214 should be close enough to one another so that any two of them can transmit simultaneously for six bit periods without becoming more than 120 degrees out of phase, given some limit on the initial phase difference between any pair of transmitters 214.

The above conditions are combined into a single design point that specifies the maximum deviation of the center frequency at any CAN node from the nominal center frequency. The nominal center frequency is denoted as f0 and the actual center frequency as fa.

$$|\Delta f| = \max_{f_u} \{|f_0 - f_u|\} \quad (1)$$

is the maximum absolute deviation of the center frequency from its nominal value. The phase difference between two carriers that results from a frequency of $$|\Delta f|$$

over six bit periods is:

$$\frac{6|\Delta f|}{R_b} \times 360°$$

where Rb denotes the bit rate. The sum of this phase difference and the maximum phase difference due to quantization of the synchronization time should be less than 120 degrees in an exemplary embodiment of the present invention. That is:

$$\left[\frac{6|\Delta f|}{R_b} \times 360°\right] + \left[\frac{f_0}{R_b} \times \frac{360°}{25}\right] \leq 120° \quad (2)$$

assuming 25 time quanta per bit. The last inequality simplifies to:

$$\Delta f| \leq \frac{R_b}{18} - \frac{f_0}{150} \quad (3)$$

which is the design point. The following table gives allowable maximal absolute frequency deviations for various combinations of Rb and F0, based on (3).

|  | $R_b$ = 10 kbits/sec | $R_b$ = 20 kbits/sec |
| --- | --- | --- |
| $F_0$ = 100 kHz | None | 444 Hz (0.44% of $f_0$) |
| $F_0$ = 75 kHz | 56 Hz (0.075% of $f_0$) | 611 Hz (0.81% of $f_0$) |
| $F_0$ = 50 kHz | 222 Hz (0.44% of $f_0$) | 778 Hz (1.56% of $f_0$) |
| $F_0$ = 25 kHz | 389 Hz (1.56% of $f_0$) | 944 Hz (3.78% of $f_0$) |

The table shows that the required frequency accuracy goes down as center frequency decreases or as bit rate increases. This is not surprising, since both of those changes in parameters have the effect of decreasing the number of cycles of the carrier per bit period. This means that the phase error arising from the fixed timing uncertainty in the synchronization uses up less of the phase error budget, and therefore, the system can afford a higher maximum frequency error. Since the initial frequency in these circuits can be trimmed to the nominal value when they are made, the errors above reflect requirements for the stability of the oscillator frequency. The stability of the oscillator frequency must be within an allowable maximal absolute frequency deviation (also referred to as an allowable frequency deviation) based on the above table. Since an exemplary embodiment of the present invention includes operating this equipment out-doors, which implies a wide temperature range, it is unlikely than any circuit using a resistor-capacitor (RC) network to set its operating frequency, will produce frequency stability on the order of 1 percent. In an exemplary embodiment, a crystal-controlled oscillator, with the frequency adjusted to the nominal, should be able to meet any of the specifications in the table expect for =10 kbits/sec and f0=100 kHz, where the entry is listed as "None" because the maximum phase error due to the timing uncertainty is greater that the maximum allowable overall phase error.

Figure 4:
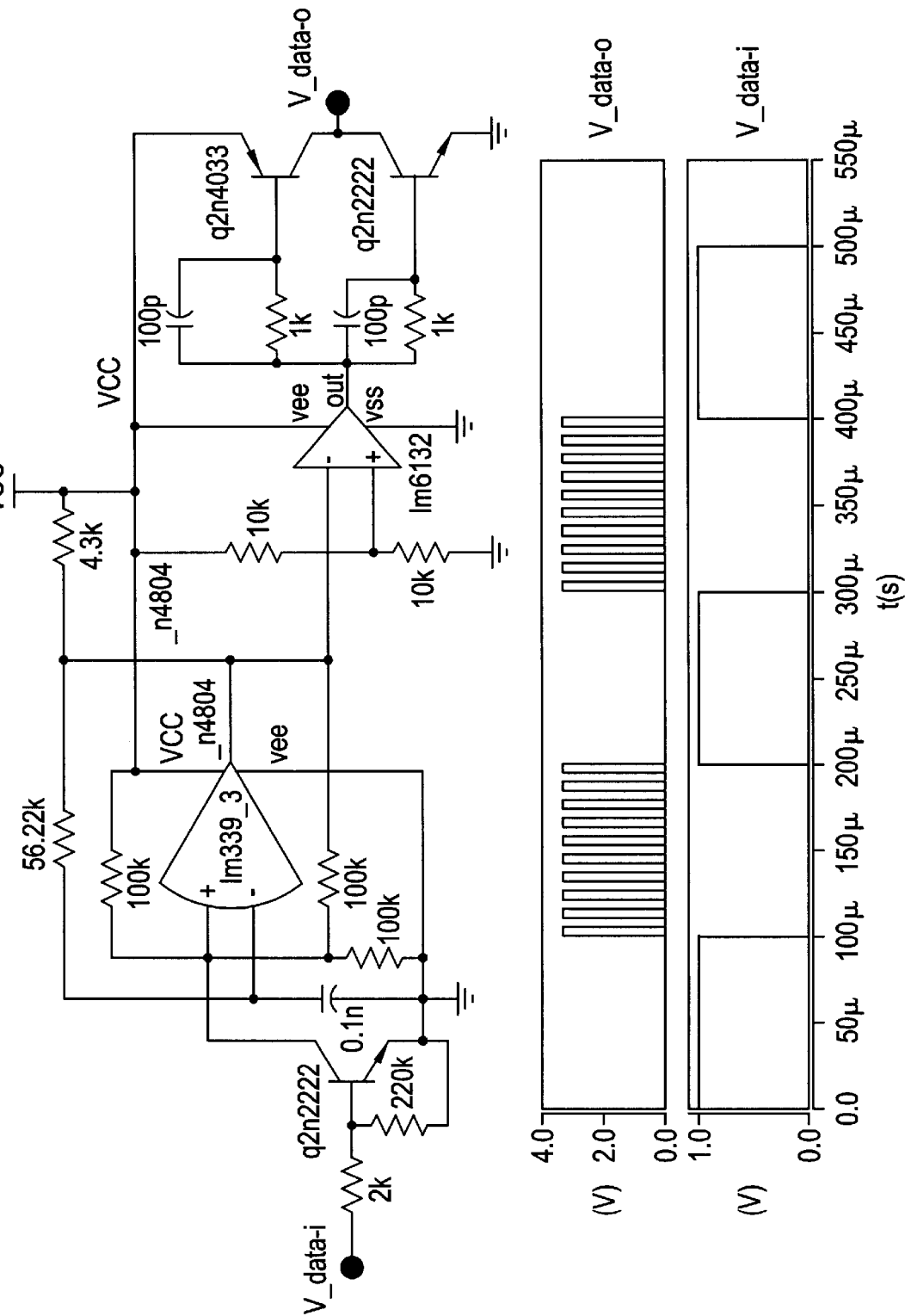
FIG. 4 is a schematic diagram of a transmitter circuit that may be utilized in exemplary embodiment of the present invention.

FIG. 4 is a schematic diagram of a transmitter 214 circuit that may be utilized in an exemplary embodiment of the present invention. The transmitter 214 circuit may include a crystal-controlled oscillator as described previously. Alternatively, the transmitter 214 may include an relaxation oscillator as depicted in FIG. 4. Also shown in FIG. 4 are examples of the simulated signals associated with the oscillator. As depicted in FIG. 4, V_data-i represents the CAN transmit pin output at logical zero and one states, representing CAN dominant and recessive states, respectively. The transmitter 214 circuit asserts its oscillator signal according to the CAN bus dominant state command as shown by signal V_data-o.

An exemplary embodiment of the present invention includes a receiver 500 that can handle a dynamic range of input signals. For example, the receiver 500 may have to handle a peak attenuation of −30 dB at 100 kHz and a noise power level of −60 dBW/kHz between a sensor module 104 at a crossing lamp and the data recorder 116 located in the crossing equipment bungalow 112. These levels are based on measurements at 100 kHz and a transmission rate of 10 kbits/sec. These ranges represent the design point for an exemplary embodiment of the present invention, other ranges and design points may be implemented in an alternate embodiment. In addition, each sensor module 104 should be able to receive its own transmission and the transmission of other sensor module 104 nodes close by, on the same end of the power line (e.g., on the flashing light mast at a railroad crossing), which will not be attenuated at all. Therefore, the receiver 500 converts both the strong "near" signal and the weak "far" signal into a logic level representing the dominant bit.

Figure 5:
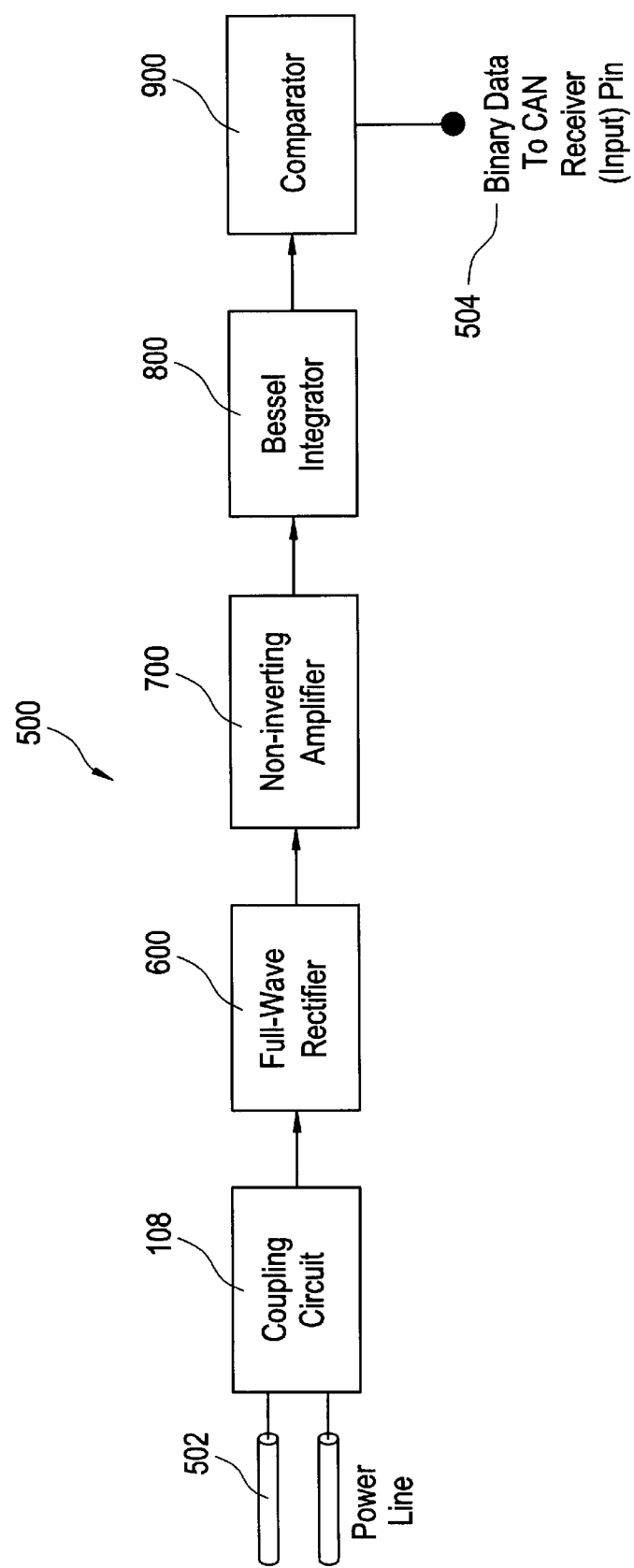
FIG. 5 is a schematic diagram of a receiver circuit that may be utilized in an exemplary embodiment of the present invention.

FIG. 5 is a schematic diagram of a receiver 500 circuit that may be utilized in an exemplary embodiment of the present invention. The structure of the receiver 500 is a serial cascade of five blocks including a coupling circuit 108, a full-wave rectifier 600, a non-inverting amplifier 700, a Bessel integrator 800 and a comparator 900. An exemplary embodiment of each of these blocks is depicted and described in FIGS. 6 through 10. Input to the receiver 500 circuit is an analog signal from the power line 502 and output is binary data 504 being sent to the CAN receiver (input) pin. Note that all of the circuits of FIG. 5 are designed to operate with a single-ended power supply, even though the input signals have both negative and positive voltages. This makes the circuits more complicated than they would be if the power supply were double-ended, since it requires that the signals be biased to be bipolar around a floating ground. Such circuit design techniques are well-known in the art and are typically used in battery-powered devices. Other embodiments are possible to implement this functionality as long as it amplifies and limits the signal in such a way that the output of the signal-to-noise-ratio (SNR) of the amplification stage is equal to the lowest SNR as per the design assumptions, and the signal occupies the majority of the available dynamic range.

Figure 6:
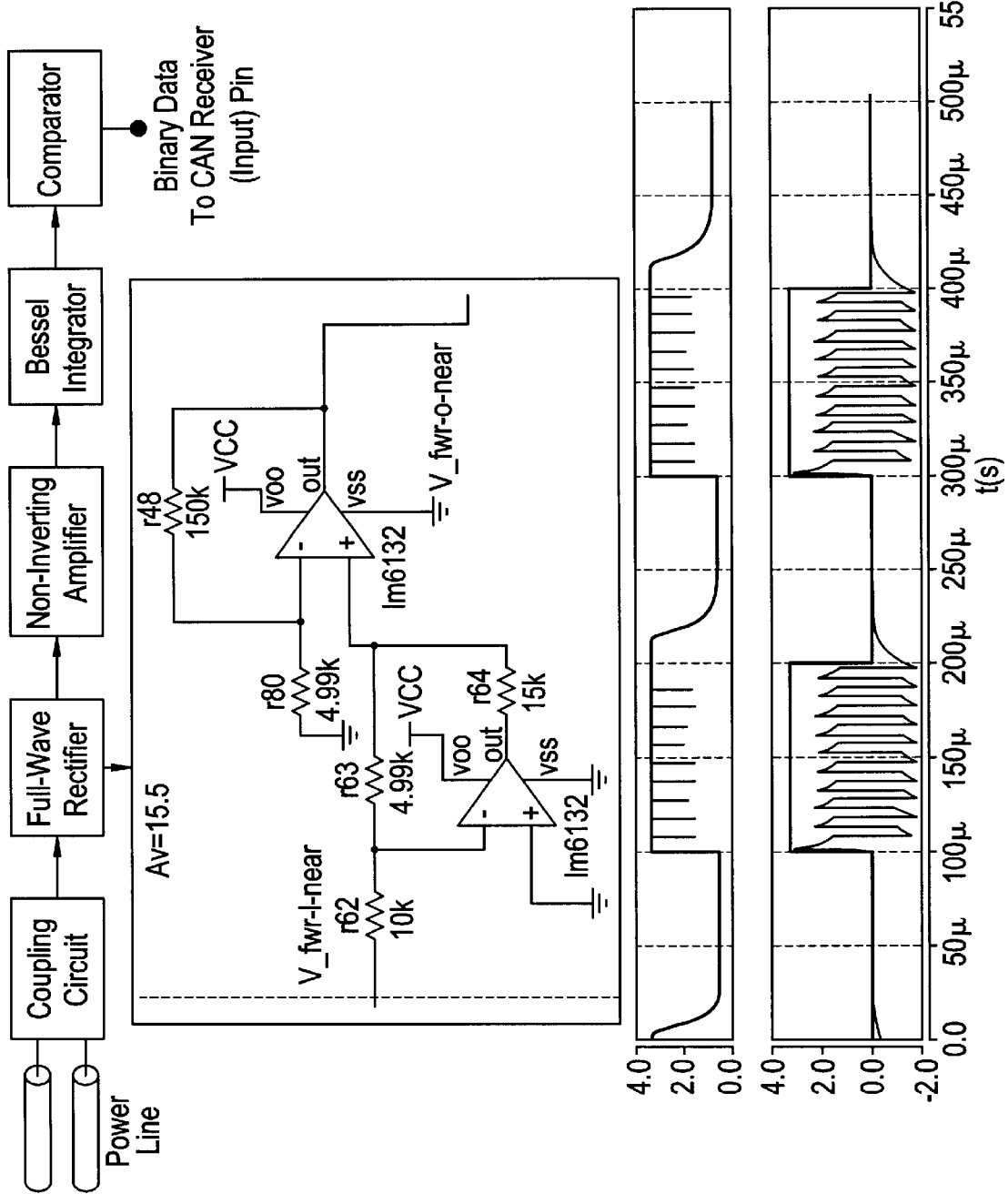
FIG. 6 is a schematic diagram of the full-wave rectifier portion of an exemplary receiver circuit.

FIG. 6 is a schematic diagram of the full-wave rectifier 600 portion of an exemplary receiver 500 circuit. Any standard full-wave rectifier known in the art, such as an active rectifier, can be utilized in an embodiment of the present invention. The full-wave rectifier 600 is utilized to approximate a squaring operation to adjust for phase uncertainty and provides amplification. An alternate embodiment of the present invention includes an amplifier prior to the full-wave rectifier 600, then the rectifier unity gain, and then the shown non-inverting amplifier. This alternate embodiment distributes the amplification across the various states with the goal of performing threshold limiting by amplifying the signal to the rails of the amplifier. Input to the full-wave rectifier 600 is a bipolar, periodic signal whose frequency is near the nominal center frequency of the modulation, and its output is a unipolar signal representing the absolute value of the input signal with respect to a floating ground level defined for the input. The signal shown as V_fwr-i-near is input to the full-wave rectifier 600 and represents the oscillator signal filtered by the coupling circuit 108 (bandpass characteristic). The output signal has values between OV and the positive voltage limit.

Figure 7:
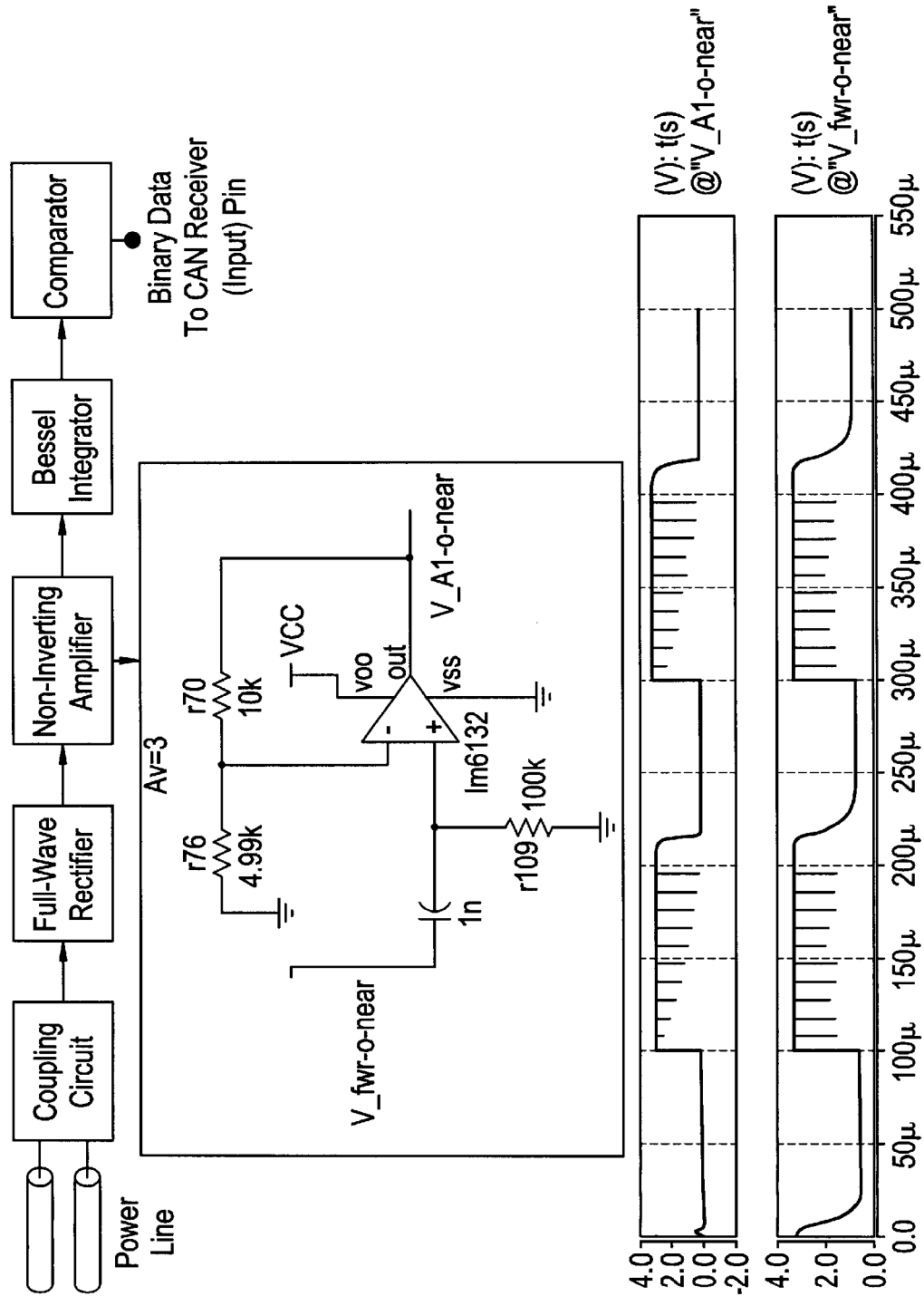
FIG. 7 is a schematic diagram of the non-inverting amplifier portion of an exemplary receiver circuit.

FIG. 7 is a schematic diagram of the non-inverting amplifier 700 portion of an exemplary receiver 500 circuit. Following the full-wave rectifier 600 is the non-inverting amplifier 700 circuitry for amplifying and limiting by clipping the signal at the end of the bandpass filter in order to avoid dynamic range issues. The intent is to perform the threshold limiting by amplifying the signal to the rails of the operational amplifier. Input to the non-inverting amplifier 700 is a blocking capacitor and a pull-up resistor that, together impose a floating ground The level at which the signal will be clipped will be determined by the transmitted voltage and the maximum attenuation of the design point. In an exemplary embodiment, the transmitted voltage is 4 volts peak-to-peak at this point and the maximum attenuation will be −30 dB. Thus, if the voltage level of the received signal is higher than the level that would be expected in the case of a 30 dB transmission loss, then the voltage will be reduced to that level. Some energy will be thrown away, but only in the case that the received SNR (power) is higher than it is expected to be in the worst case.

Figure 8:
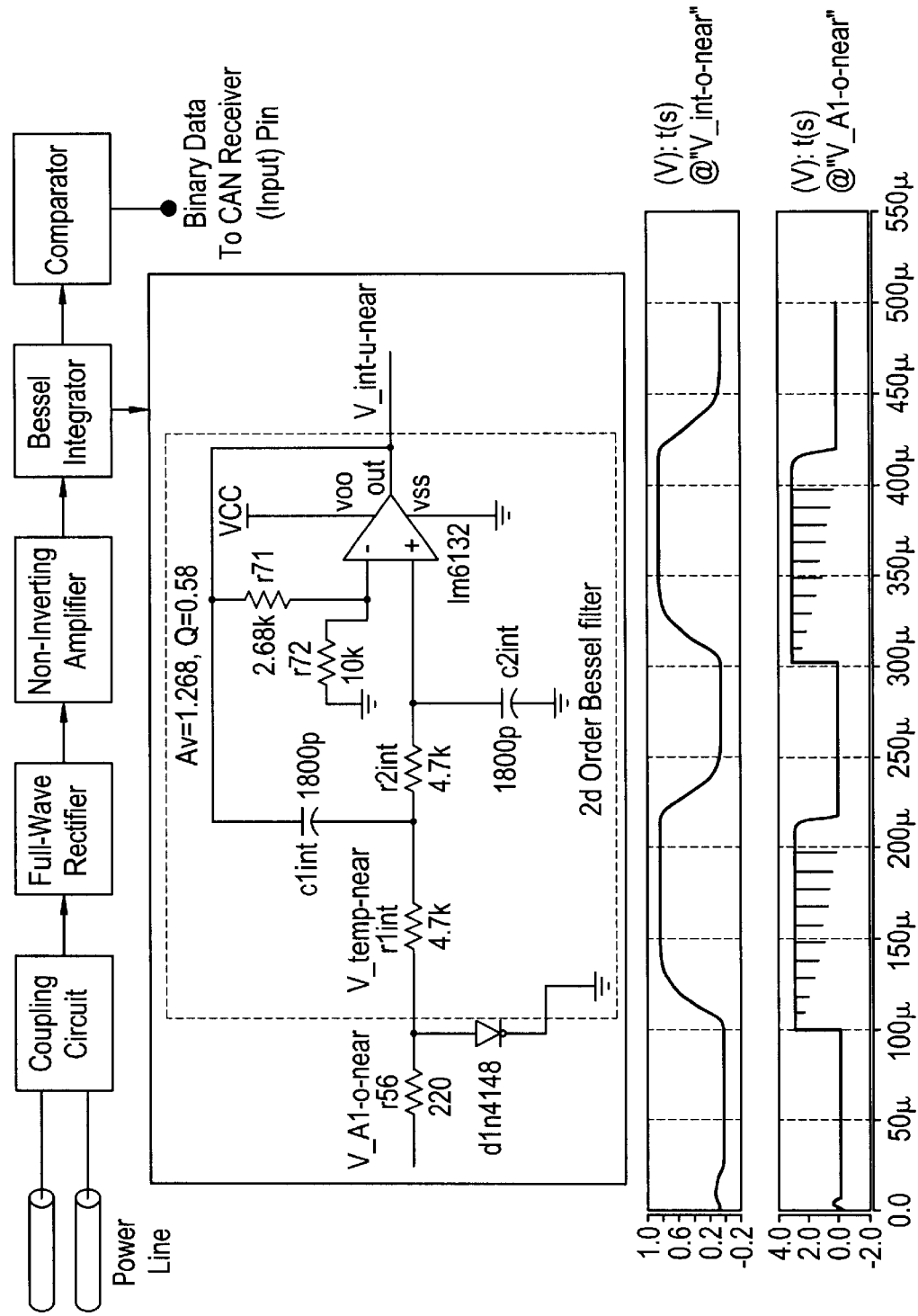
FIG. 8 is a schematic diagram of the Bessel integrator portion of an exemplary receiver circuit.

FIG. 8 is a schematic diagram of the Bessel integrator 800 portion of an exemplary receiver 500 circuit. The Bessel integrator 800 depicted is a standard second order Bessel-Thomas filter. Because, in an exemplary embodiment, the CAN bit decision sample threshold is applied 60 milliseconds into each 100 millisecond bit, the required finite-time integration is approximated by a filter with an impulse response that rises quickly and remains at approximately a constant level and then falls to a low level after 69 milliseconds. The Bessel integrator 800 circuit depicted in FIG. 8 is a typical Bessel integrator circuit as is known in the art. The Bessel integrator 800 circuit depicted in FIG. 8 has been specifically designed for the desired 69 millisecond duration but other durations are possible with an alternate embodiment of the present invention.

Figure 9:
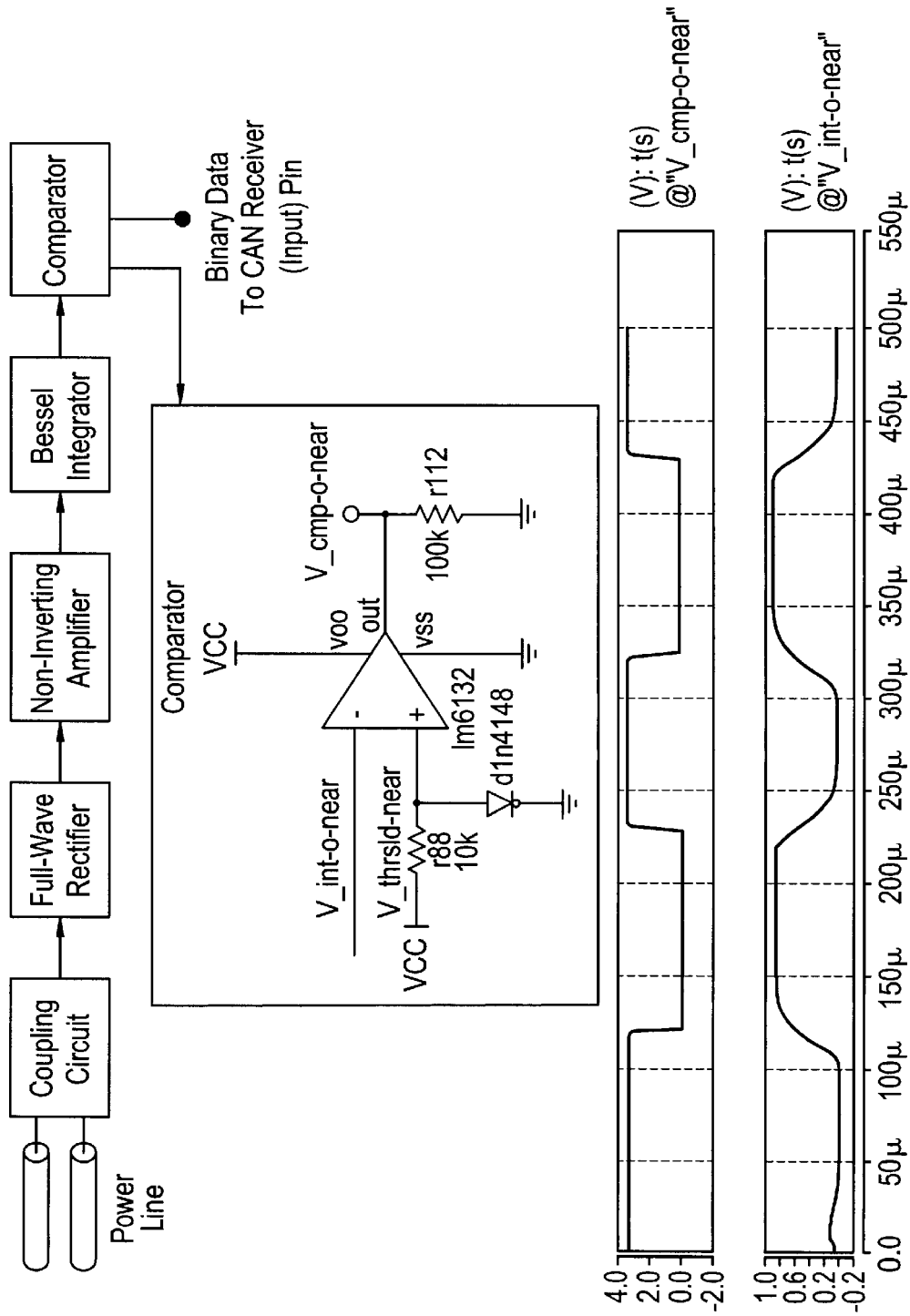
FIG. 9 is a schematic diagram of the comparator portion of an exemplary receiver circuit.

FIG. 9 is a schematic diagram of the comparator 900 portion of an exemplary receiver 500 circuit that is utilized as a threshold detector and for conversion to logic level. At the output of the Bessel integrator 800, the voltage is compared to a threshold level that is set to a pre-selected certain false alarm probability. The threshold level can be determined to give a desired false alarm probability, from the circuit point of view. The comparator 900 compares the output voltage to a fixed reference level, and outputs a logic "0" in case the threshold is exceeded and a logic "1" otherwise. As discussed in the background section, these comparator 900 outputs are consistent with the CAN protocol dominant and recessive bus states which are equivalent to logical zero and one, respectively.

Figure 10:
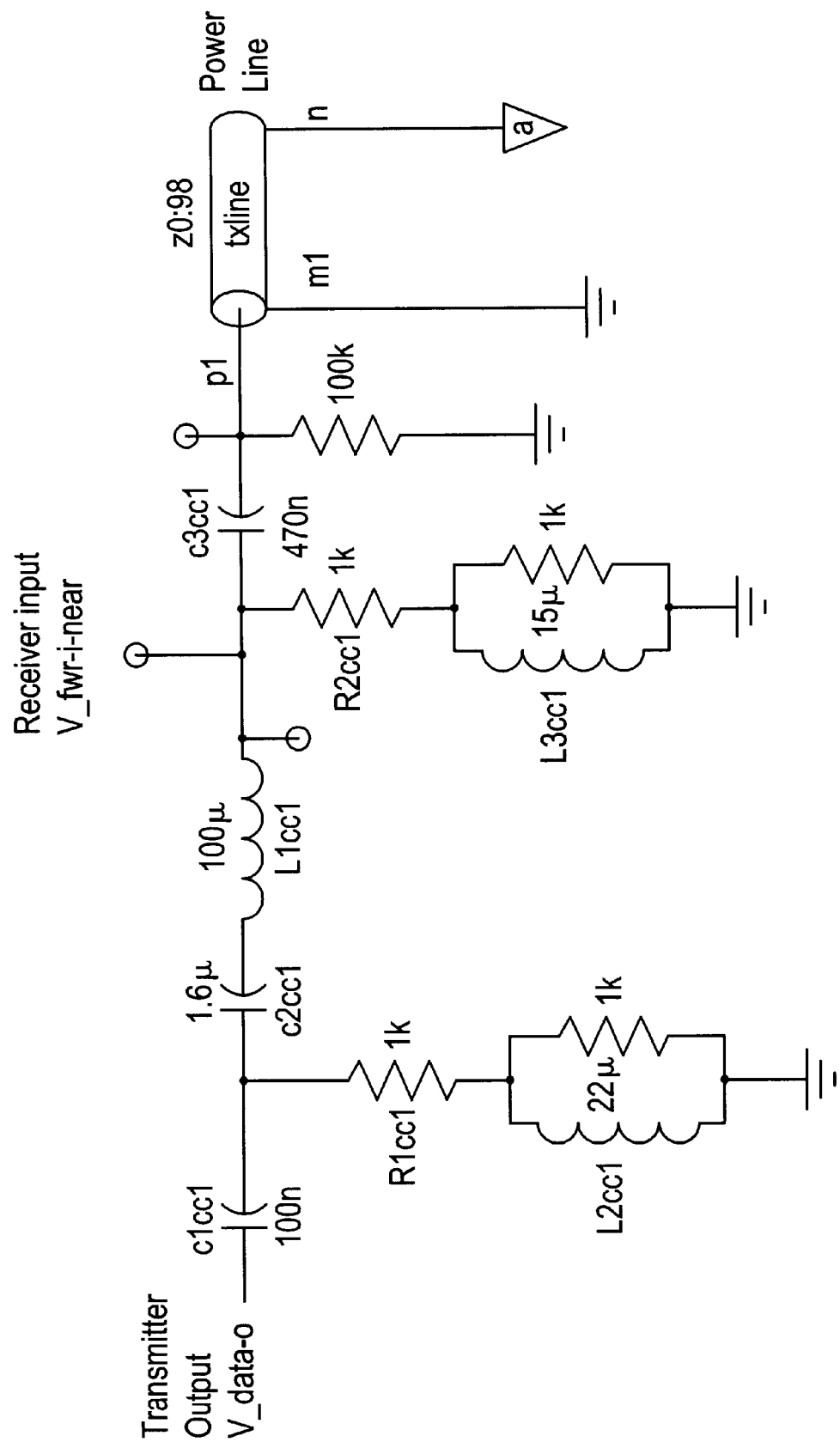
FIG. 10 is a schematic circuit diagram of a power line coupling circuit that may be utilized in an exemplary embodiment of the present invention.

FIG. 10 is a schematic circuit diagram of a power line coupling circuit 108 that may be utilized in an exemplary embodiment of the present invention. Any coupling circuit 108 for PLC that provides a highpass or bandpass filter characteristic that eliminates the low frequency power signal can be utilized. Input to the coupling circuit 108 is the sum of the communications signal and the power-bearing waveform. The coupling circuit 108 is a typical coupling circuit as is known in the art with a combination of RLC resonant tank circuits which are designed to afford a bandpass filter response centered at 100 kHz (the carrier frequency) and to match the power line characteristic impedance of approximately 98 Ohms. Either a discrete inductor or a transformer can be utilized with the power line coupling circuit 108.

The present invention has been described in reference to an embodiment for transmitting sensor data from railroad crossings via the power lines utilized to provide power to lamps located at the railroad crossings. Other applications that require a group of loosely coupled transceivers to share a communication line using the CAN protocol can be implemented utilizing an embodiment of the present invention. For example, an embodiment of the present invention could be utilized as an electronic key where the power line is used to power the lock device as well as exchange user provided authentication code information with an authorizing database. An alternative embodiment of the present invention could be utilized with an automobile sensor and control where sensors communicate with controllers over a battery bus. Residential uses are also possible, for example, residential security such as infra red sensor monitoring and powering; and residential appliance automation where appliances are turned on or off via commands over the power line the operating conditions (e.g., oven temperature, radio volume) of the appliance are monitored.

An embodiment of the invention provides for a power line carrier physical layer that supports a non-destructive bit arbitration scheme for sharing of the communication medium. As such, this physical layer enables the CAN link layer protocol and can take advantage of low cost hardware that supports the CAN protocol. This can result in a low cost and low complexity method conducive to integration at railroad crossing warning devices and other application requiring coordination of data being transmitted across a network of nodes connected by power lines. The use of a deterministic, initial phase for transmitter onset allows a lower complexity and lower cost power line transceiver circuit. Synchronization of data bits can be performed by the CAN link layer protocol without incorporation of phase locked loops for tracking signal phase/frequency. An embodiment of the present invention allows for multiple nodes to contend for access to the communication bus without their carrier signals destructively interfering and canceling each other.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for modulating a carrier frequency to support nondestructive bitwise arbitration of a communication medium, comprising:

a first sensor module coupled to a power supply line via a first power line coupling circuit, wherein said first sensor module comprises:

a first micro-controller; and a first transceiver including a first transmitter for converting a digital signal received from said first micro-controller into a first analog signal for transmission on said power supply line, said first transmitter including a first oscillator operating within an allowable frequency deviation to provide a first predetermined onset phase; and a second sensor module coupled to said power supply line via a second power line couple circuit, wherein said second sensor module comprises:

a second micro-controller; and a second transceiver including a second transmitter for converting a digital signal received from said second micro-controller into a second analog signal for transmission on said power supply line, said second transmitter including a second oscillator operating within said allowable frequency deviation to provide a second predetermined onset phase, second analog signal is different from said first analog signal and said second predetermined onset phase is different from said first predetermined onset phase, the difference between said first predetermined onset phase and said second predetermined onset phase being within a limit.

2. The system of claim 1 wherein said first analog signal has a center frequency such that the first analog signal can be separated from a power supply waveform on said power supply line.

3. The system of claim 2 further comprising a linear filter for separating said first analog signal waveform from said power supply waveform.

4. The system of claim 1 wherein said first micro-controller and said second micro-controller exchange data according to the controller area network (CAN) standard.

5. The system of claim 4 wherein said first oscillator is electrically connected to said first micro-controller via a CAN transmit pin located on said first micro-controller and said first micro-controller turns on said first oscillator in response to asserting a dominant bit state.

6. The system of claim 4 further comprising a CAN controller electrically connected to said first micro-controller and to said first transceiver and wherein said CAN controller turns on said first oscillator in response to asserting a dominant bit state.

7. The system of claim 1 wherein said first transceiver further includes a receiver for converting said analog signal into said digital signal.

8. The system of claim 7 wherein said receiver performs in-band energy detection.

9. The system of claim 7 wherein said receiver comprises:
a coupling circuit;
a full wave rectifier circuit electrically connected to said coupling circuit;
a non-inverting amplifier circuit electrically connected to said full wave rectifier circuit;
a Bessel integrator circuit electrically connected to said non-inverting amplifier circuit; and
a comparator electrically connected to said Bessel integrator circuit.

10. The system of claim 1 wherein said first transmitter utilizes on/off shift keying for modulation.

11. The system of claim 1 wherein said first oscillator is controlled by said first predetermined onset phase, said allowable frequency deviation, a set of system operating procedures and the specifications associated with said first oscillator.

12. The system of claim 1 wherein said limit is 120 degrees.

13. The system of claim 1 wherein said first oscillator is an op-amp based relaxation oscillator.

14. The system of claim 1 wherein said first oscillator is a Weinbridge oscillator and said system further comprises an automatic gain adjustment circuit coupled to said first oscillator.

15. The system of claim 1 wherein said first oscillator is a crystal-controlled oscillator.

16. A system for modulating a carrier frequency to support nondestructive bitwise arbitration of a communication medium, comprising:
a sensor module locally coupled to a warning system for sensing operational performance of the warning system and to a power supply line, said sensor module comprising:
a sensor element for transducing physical phenomena into electrical signals;
a micro-controller that exchanges-data according to the controller area network (CAN) standard coupled to said sensor element;
a transceiver coupled to said micro-controller, said transceiver responsive to CAN bus states issued by said micro-controller for communicating data between said power supply line and said micro-controller, said transceiver including:
a transmitter for converting a digital signal from said micro-controller into an analog signal for transmission on said power supply line, said transmitter including an oscillator operating within an allowable frequency deviation to provide a predetermined onset phase, wherein said transmitter utilizes on/off shift keying for modulation; and
a receiver for converting said analog signal from said power supply line into a digital signal for input to said micro-controller, said receiver including an in-band energy detector; and
a sensor hub coupled to said power supply line for receiving data from said sensor module via said power supply line.

17. The system of claim 16 wherein said warning system is located at a railroad crossing.

18. The system of claim 16 wherein said warning system includes a flashing light.

19. The system of claim 16 wherein said sensor module includes at least one of a light sensor, a light alignment sensor, a temperature sensor, a noise sensor, a position sensor and an acceleration sensor.

20. A method for modulating a carrier frequency to support nondestructive bitwise arbitration of a communication medium, comprising:
receiving a request to initiate data transfer including a first controller area network (CAN) formatted message frame with a first identifier, wherein said request is received from a first micro-controller located at one of a plurality of nodes coupled to a power supply line;
detecting an idle CAN bus on said power supply line;
sending said first CAN formatted message frame across said power supply line using a first transceiver operating according to the CAN protocol, wherein said first transceiver includes a first transmitter that includes a first oscillator operating within an allowable frequency deviation and said sending said first CAN formatted message frame includes turning on said first oscillator in a first predetermined onset phase in response to detecting a dominant bit in said first identifier to implement said CAN protocol over said power supply line; and
sending a second CAN formatted message frame including a second identifier across said power supply line using a second transceiver operating under the CAN protocol, wherein said second transceiver includes a second transmitter that includes a second oscillator operating within said allowable frequency deviation and said sending said second message frame includes turning on said second oscillator in a second predetermined onset phase in response to detecting a dominant bit in said second identifier to implement said CAN protocol over said communication medium, wherein said second predetermined onset phase is different than said first predetermined onset phase, the difference between said first predetermined onset phase and said second predetermined onset phase being within a limit.

21. The method of claim 20 wherein said sending said first CAN formatted message frame further includes performing bit wise arbitration to determine if the first message frame has priority over the second message frame.

22. The method of claim 20 wherein said sending said first CAN formatted message frame further includes:

converting said first CAN formatted message frame from a digital signal into an analog signal utilizing said first oscillator in said first transmitter;

performing bit wise arbitration to determine if the first CAN formatted message frame has priority over the second CAN formatted message frame;

converting data received via said power supply line from said analog signal into a digital signal using a receiver included in said first transceiver;

sending said data received to said first micro-controller.

23. The method of claim 20 wherein said first transmitter utilizes on/off shift keying to perform modulation.

24. The method of claim 20 wherein said limit is 120 degrees.

* * * * *